United States Patent [19]
Clark et al.

[11] Patent Number: 6,046,265
[45] Date of Patent: Apr. 4, 2000

[54] CRYSTALLINE RESIN COMPOSITIONS HAVING A SPECIAL EFFECT SURFACE APPEARANCE

[75] Inventors: Angelika H. Clark, Mt. Vernon, Ind.; James A. Catelotti, North Adams, Mass.; Robert R. Gallucci, Mt. Vernon; Parfait J. M. Likibi, Newburgh, both of Ind.

[73] Assignee: General Electric Company, Pittsfield, Mass.

[21] Appl. No.: 09/010,024

[22] Filed: Jan. 21, 1998

[51] Int. Cl.[7] .................. C08J 5/10; C08K 3/30; C08L 67/00
[52] U.S. Cl. ............. 524/423; 525/439; 525/444
[58] Field of Search .................. 525/439, 444; 524/423, 492, 493, 494

[56] References Cited

U.S. PATENT DOCUMENTS

| | | | |
|---|---|---|---|
| 4,299,792 | 11/1981 | Nunn | 264/328.18 |
| 5,053,176 | 10/1991 | Cameron et al. | 264/75 |
| 5,232,751 | 8/1993 | Cameron et al. | 428/15 |
| 5,387,381 | 2/1995 | Saloom | 264/75 |
| 5,399,429 | 3/1995 | Asrar | 428/364 |
| 5,489,656 | 2/1996 | Ohtsuka et al. | 525/463 |
| 5,510,398 | 4/1996 | Clark et al. | 523/171 |
| 5,631,085 | 5/1997 | Gebauer | 428/377 |

FOREIGN PATENT DOCUMENTS

| | | |
|---|---|---|
| 85 12 190 U | 4/1985 | Germany. |
| 85 30 358 U | 10/1985 | Germany. |

*Primary Examiner*—James J. Seidleck
*Assistant Examiner*—U. K. Rajgurn

[57] ABSTRACT

A crystalline resin molded article with a non-uniform appearance, or a process for making such an article, comprising a molded blend of a granular crystalline resin base resin and a granular crystalline resin colored concentrate which has contrasting color properties. The granular color concentrate comprising a crystalline resin carrier resin having a melting temperature sufficiently higher than the base resin for non-uniformly dispersing the granular color concentrate into the base resin during molding to produce a non-uniform appearance in said molded article.

19 Claims, 1 Drawing Sheet

CRYSTALLINE RESIN COMPOSITIONS HAVING A SPECIAL EFFECT SURFACE APPEARANCE

FIELD OF THE INVENTION

Crystalline resin molding compositions having a desirable decorative surfacing effect.

BACKGROUND OF THE INVENTION

Thermoplastic molding compositions having various properties, such as ceramic like properties, may be formed into diverse articles for use in numerous applications. In the decorative surfacing industry custom colors and special-effect appearances are desirable properties for customer acceptance.

One such decorative colorant is described in U.S. Pat. No. 5,510,398 to Clark et. al. A speckled surface is achieved through a non-dispersing pigment as opposed to a filler because the non-dispersing pigment does not appreciably add to the base color of the resin. Rather, the non-dispersing pigment provides a separate, visibly distinct and identifiable color at numerous sites across the surface of the material wherever the pigment material is visible. In other words, the speckle is visible in the filled polymer matrix as a distinct region of contrasting color. In a similar fashion, thermoset colorants are used to achieve non uniform coloring as described in U.S. Pat. No. 5,489,656.

U.S. Pat. No. 5,387,381 discloses a process for combining powder and accent color pellets to achieve wood grain effect. U.S. Pat. Nos. 5,053,176, 5,232,751 and 4,299,792 describe mechanical devices to achieve non uniform colored articles.

SUMMARY OF THE INVENTION

The present invention provides a thermoplastic crystalline resin composition having a specific decorative surface due to the presence of a partially dispersed effective amount of a decorative colorant.

According to the present invention, there is provided a crystalline resin molded article having a non-uniform appearance comprising a molded blend comprising a granular crystalline resin base resin and a granular crystalline resin colored concentrate having contrasting color properties, said granular color concentrate comprising a crystalline resin carrier resin having a melting temperature sufficiently higher than the base resin for non-uniformly dispersing the granular color concentrate into the base resin during molding to produce a non-uniform appearance in said molded article.

According to a molding process, a mixture of resin granules of a crystalline resin color concentrate having a higher melting temperature than resin granules of the base resin are consolidated into a molded article at a temperature sufficiently above the melting temperature of the base resin wherein the higher melting concentrate is subjected to melt temperatures which cause the concentrate to non-uniformly disperse into the base resin to produce a foreground non-uniform color in the base resin. The color granulate is not thoroughly dispersed into the base resin so as to lose the color differentiation.

Also, according to preferred embodiments, there is provided a color concentrate for imparting a non-uniform coloration to a thermoplastic crystalline resin base resin wherein the color concentrate consists essentially of a thermoplastic crystalline resin different than the thermoplastic crystalline resin base resin and has a melting temperature at least about 15 degrees Centigrade above the melting temperature of the base resin.

DETAILED DESCRIPTION OF THE INVENTION

Figure 1:
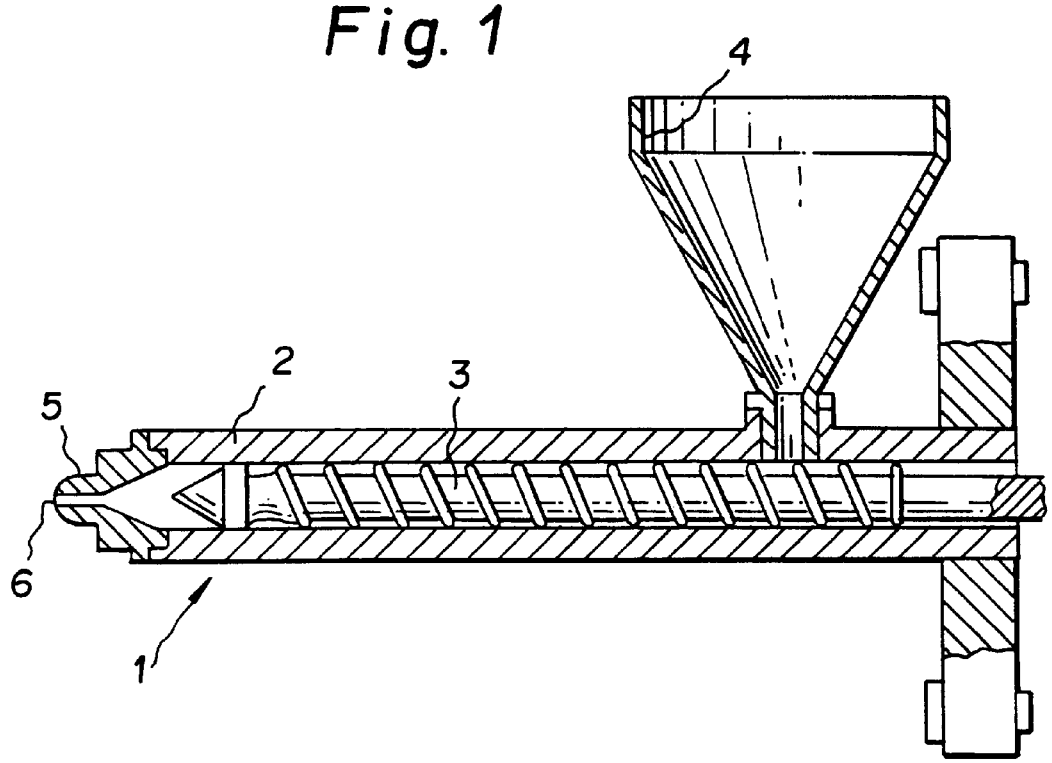
FIG. 1 is a schematic illustration in cross section of an extrusion machine that may be utilized to consolidate the molded article of the present invention.

The present invention utilizes a color concentrate which is partially dispersed by a molding process in the base resin. It is contemplated that the dispersed or non-uniform coloration may produce a swirl, variegated, veined, streaked or marble look to the molded article.

Preferred molding methods include extrusion or injection molding. During processing the color concentrate and the base resin are mixed by the processing equipment so that partial or incomplete mixing of the components is achieved. Typically, this is facilitated by feeding the color concentrate downstream near the outlet of the extruder or molding machine. However with proper mixing all ingredients maybe also be throat fed to achieve the decorative effect.

FIG. 1 is illustrative of a standard extrusion machine. The extruder 1 has a housing 2 having a central opening with a helical screw 3 mounted for rotation along an axis interior the housing or barrel portion 2. A motor drives the screw through a gear reducer. At one end of the opening, a hopper 4 is utilized for feeding material to be extruded into the rear portion of the screw 3. Helical threads mounted on the screw 3 are positioned for moving material from the rear portion of the screw to a forward portion. As the material or feedstock is conveyed along the screw 3, it is heated by frictional forces caused by rotation of the screw 3. It is preferred that an external heating source such as electrical heaters be provided to heat the feedstock.

At the forward end of the barrel and spaced from the forward end of the screw 3, a gate or breaker plate maybe mounted transverse to the flow of feedstock. The plate acts to create a back pressure which contributes to the mixing and heating of the feedstock. However, extensive mixing of the blend should be avoided.

A die body 5 is mounted on the forward end of the housing 2. The die body 5 may include a tapered central and axially aligned opening 6 which channels the feedstock. At the die outlet an opening 6 has the desired cross sectional shape of the lineal profile or sheet to be extruded.

The present invention is illustrated with respect to an extruded sheet or profile but it is contemplated that other methods of molding may be utilized such as injection molding, blow molding or other techniques which consolidate the feedstock resins above their glass transition or melting temperatures and introduce some degree of shearing of the melt during the mixing process.

The surface of a sheet of material processed through the extruder will show striated areas of contrasting colors within the background matrix so as to give a marble effect. A single screw extruder is preferred to achieve this effect since incomplete mixing is desirable and the single screw provides less mixing than other devices such as the typical twin screw extruder.

According to a molding process of the present invention, the feedstock is a mixture of resin granules of a crystalline resin color concentrate, which has a higher melting temperature than resin granules of the base resin, and a base or matrix resin. These materials are consolidated into a molded article at a temperature sufficiently above the glass transition or melting temperature of the base resin wherein the higher melting concentrate is subjected to melt temperatures which cause the concentrate to non-uniformly disperse into the base resin to produce a foreground marble appearance in the base resin.

A mixture of granules of the colored concentrate and the base resin are fed into the hopper and conveyed to the die by the screw. During the conveying, the pellets are initially compressed and deformed. Heating of the pellets occurs from the mechanical work and the friction generated by the screw. External heating may additionally be utilized to control the temperature in the extruder. Desirably, a gradient of increasing temperature exists from the initial feeding of pellets to the formation of a melted extrudate just prior to molding the final shape. When a mixture of base resin and the color concentrate is introduced into the hopper, the base resin which has a lower melting temperature than the color concentrate melts first. The colored concentrate is initially compressed and deformed but complete melting may be delayed due to its higher melting temperature. The increasing temperature gradient and degree of mixing along the barrel is controlled so that color concentrate melts just prior to the formation of the final article so that the concentrate is non-uniformly dispersed into the base resin resulting in a marble effect.

It is also contemplated that the color concentrate may be introduced into the extruder through a second hopper downstream of a first hopper through which the base resin is introduced. In this case, the color concentrate is subjected to less mechanical work and friction generated by the screw. Desirably, the process conditions of mixing and temperature are selected so that the color concentrate is only partially mixed into the base resin.

Since smaller granules tend to be dispersed more quickly in a melt of base resin, it is desirable to select the pellet size of the colorant concentrate to promote the desired pattern. A preferred size of the color granulate in pellet form is a cylinder diameter of about 2.0 to about 10.0 millimeter with a length of about 2 to about 15 millimeter. For spherically shaped granules, a preferred size is from 2 to 15 millimeters in diameter.

According to the present invention, there is provided a crystalline resin molded article having a marble appearance produced from a moldable blend of granular resin comprising from 0.05 to 25 percent by weight of a granular color concentrate having dispersed foreground color imparting properties and from 75 to 99.05 percent by weight of granular crystalline resin base resin. Color concentrate is preferably used at 0.5–10% percent by weight of the composition. The granular concentrate typically comprises from about 1 to 50 percent by weight colorant dispersed in a crystalline resin carrier resin. It is contemplated that coloration may be imparted to the carrier resin with dyes, pigment, or other means to create optically contrasting colors or visually contrasting colors. The granular concentrate has a melting point higher than the granular base resin for providing a foreground dispersed coloration during molding.

For processing into a molded article, the concentrate and the base resin are typically separately pelletized by compounding in an extruder. The molded articles may be formed by blending the granular color concentrate with a granular base resin and performing the molding operation. By utilizing an appropriate color concentrate, it is possible to achieve molded articles with desirable dispersed color patterns.

The preferred molding temperatures are from 200 to 300 degrees Centigrade. Both the base resin and the color concentrate desirably have a melting range within the preferred molding temperature range. The melting temperature of the color concentrate is selected to be at least about 15 degrees Centigrade higher than the melting temperature range of the base resin. The molding temperature depends on the particular thermoplastic crystalline resins utilized.

The preferred base resins are poly(alkylene terephthalates) or mixtures comprising poly(alkylene terephthalates) with the base resin comprising from about 15 to about 100 percent by weight of such resin. Most preferred are poly(butylene terephthalate) or mixtures comprising poly(butylene terephthalate). As set forth in Kirk-Othmer, Encyclopedia of Chemical Technology, volume 18, page 552, Third Edition, the melting point of pure, annealed poly(ethylene terephthalate) is as high as 280 degrees Centigrade while commercial products melt at 255–265 degrees Centigrade. Poly(butylene terephthalate) melts at 222–232 degrees Centigrade while the glass transition temperature is from 30–50 degrees Centigrade.

The color concentrate imparts a coloration, such as a marble, swirl, variegated, veined or non-uniform look. The color concentrate consists essentially of colorant and a thermoplastic carrier crystalline resin different than the thermoplastic crystalline resin base resin and has melting temperature of least about 15 degrees Centigrade above the melting temperature of the base resin. With longer processing times the concentrate may have a melting temperature of greater than 25 to 75 degrees Centigrade above melting temperature of the base resin. Most preferably the melting temperature is less than about 100, preferably less than about 75 degrees Centigrade.

The color concentrate preferably comprises a polyalkylene naphthanoate or a poly(aryl cyclohexane dimethanol) resin. Since the naphthanoates are optical brighteners, they may be preferred for visual effects. The most preferred crystalline resin for the color concentrate resin is "PEN", polyethylene naphthanoate, which melts at a temperature of 255 to about 270 degrees Centigrade. Adjustments to the melting temperature of the concentrate or the base resin may be made by including higher or lower melting crystalline resin resins in the color concentrate, or modifying resin structure by forming copolymers so as to achieve the previously mentioned desirable melting point differences.

The ingredients for the color concentrate include the crystalline resin carrier resin and a colorant to impart coloration. The colorant may be in the form of a pigment or dye. Typical pigments and dyes that may be utilized with crystalline resins are set forth in the Plastics Additives Handbook, $4^{th}$ Edition, Hanser/Gardner Publications, Inc., Cincinnati, Ohio, on pages 663 to 676 where colorants are listed and incorporated herein by reference. The color concentrate includes a suitable amount (0.05–50%) of pigment or dye to impart the desired color to the concentrate. The combination of colorant and carrier resin have a melt temperature suitable for giving the desired color effect.

Typical crystalline resins include polyesters, polyamides, polyolefins and polystyrenes. Preferred crystalline resin components which may be utilized as components for the base resin or for the carrier resin for the concentrate include crystalline polyesters such as polyesters derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

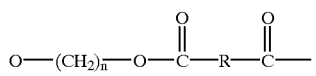

wherein n is an integer of from 2 to 6. R is a $C_6-C_{20}$ aryl radical comprising a decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid, naphthalene dicarboxylic acid or a mixtures thereof.

The most preferred polyesters are poly(ethylene terephthalate) ("PET"), poly(1,4-butylene terephthalate), ("PBT"), and poly(propylene terephthalate) ("PPT"). PBT is preferred for fast crystallization. PET is desirable to use to obtain enhanced surface properties especially in injection molded parts.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mole %, preferably at least 80 mole %, of which consists of tetramethylene glycol and an acid component at least 70 mole %, preferably at least 80 mole %, of which consists of terephthalic acid, and polyester-forming derivatives therefore. The preferred glycol component can contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The preferred acid component can contain not more than 30 mole %, preferably not more than 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxy benzoic acid, sebacic acid, adipic acid and polyester-forming derivatives thereof.

Blends of polyesters may also be employed in the polyester compositions. These blends require intimate mixing to achieve a uniform appearance of the blend. As indicated earlier, preferred polyesters are poly(ethylene terephthalate) and poly(1,4-butylene terephthalate). When blends of these preferred components are employed the polyester resin component can comprise from about 1 to about 99 parts by weight poly(ethylene terephthalate) and from about 99 to about 1 part by weight poly(1,4-butylene terephthalate) based on 100 parts by weight of both components combined.

The base resin preferably comprises at least about 20 percent by weight polyester, preferably from 5 to about 30 percent by weight of an amorphous resin, from 0 to about 40, preferably from 2 to about 20, percent by weight rubbery impact modifier, from 0 to about 70, preferably from 10 to about 55 percent by weight of a filler material. The most preferred matrix or base resin is described in U.S. Pat. No. 5,441,997 to Clark et. al. which specification is incorporated by reference into the present specification. The melting temperature of the most abundant crystalline material in blended base resins may typically be used for determining the desired melting temperature of the color concentrate.

Preferred amorphous resins as additives for the base resin include polycarbonate, and styrene and acrylic resins and mixtures of such or copolymers thereof. The styrene and acrylic polymers are substantially free of rubber and are preferably resinous, thermoplastic polymers of styrene, a-methylstyrene, methyl acrylate, methylmethacrylate, acrylonitrile, methacrylonitrile, maleic acid anhydride, N-substituted maleimide, vinyl acetate or mixtures thereof. Styrene/acrylonitrile copolymers, a-methylstyrene/acrylonitrile copolymers and methylmethacrylate copolymers are preferred. These polymers are typically prepared by radical polymerization, in particular by emulsion, suspension, solution or bulk polymerization. They preferably have number average molecular weights of from 20,000 to 200,000.

The most preferred amorphous resin is polycarbonate. Polycarbonate resins useful in preparing the blends of the present invention are generally aromatic polycarbonate resins.

Typically these are prepared by reacting a dihydric phenol with a carbonate precursor, such as phosgene, a haloformate or a carbonate ester. Generally speaking, such carbonate polymers may be typified as possessing recurring structural units of the formula

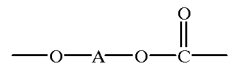

wherein A is a divalent aromatic radical, preferably a dihydric phenol or biphenol employed in the polymer producing reaction. The dihydric phenol which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; biphenol; 2,2-bis(4-hydroxyphenyl) pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2'-dihydroxydiphenyl; 2,6-dihydroxynaphthalene; bis(4-hydroxydiphenyl)sulfone; bis(3,5-diethyl-4-hydroxyphenyl) sulfone; 2,2-bis(3,5-dibromo-4-hydroxyphenyl)propane; 2,2-bis(3,5-dimethyl-4 -hydroxyphenyl)propane; 2,4'-dihydroxydiphenyl sulfone; 5'-chloro-2,4'-dihydroxydiphenyl sulfone; 4,4'-dihydroxydiphenyl ether; 4,4'-dihydroxy-3,3'-dichlorodiphenyl ether, and the like.

Other dihydric phenols which are also suitable for use in the preparation of the above polycarbonates are disclosed in U.S. Pat. Nos. 2,999,835; 3,038,365 and 4,131,575.

These aromatic polycarbonates can be manufactured by known processes, such as, for example and as mentioned above, by reacting a dihydric phenol with a carbonate precursor, such as phosgene, in accordance with methods set forth in the above-cited literature or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use in the preparation of the polycarbonate mixtures of the invention. Polyarylates and polyester-carbonate resins or their blends can also be employed. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

In any event, the preferred aromatic carbonate for use in the practice in the present invention is a homopolymer, e.g., a homopolymer derived from 2,2-bis(4-hydroxyphenyl) propane (bisphenol-A) and phosgene, commercially available under the trade designation LEXAN Registered TM from General Electric Company.

The instant polycarbonates are preferably high molecular weight aromatic carbonate polymers having an intrinsic viscosity, as determined in chloroform at 25° C. of from about 0.3 to about 1.5 dl/gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bisphenol,tris-phenol TC (1,3,5-tris((p-hydroxyphenyl) isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid and benzophenone tetracarboxylic acid. The branching agent may be added at a level of about 0.05–2.0 weight percent. Branching agents and procedures for making branched polycarbonates are described in U.S. Pat. Nos. 3,635,895 and 4,001,184 which are incorporated by reference.

All types of polycarbonate end groups are contemplated as being within the scope of the present invention.

Preferably the base polyester resin composition comprises an aromatic polycarbonate resin present at a level of from 5 to 50 percent by weight based on the total weight of the material, and a polyester resin present at a level of from 95 to 50 percent by weight based on the total weight of the thermoplastic resin composition.

As previously mentioned, the crystalline resin base resin may optionally contain impact modifiers such as a rubbery impact modifier. Typical impact modifiers are derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials including natural and synthetic polymeric materials showing elasticity at room temperature. They include both homopolymers and copolymers, including random, block, radial block, graft and core-shell copolymers as well as combinations thereof. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth) acrylate. The core and/or the shell(s) often comprise multifunctional compounds which may act as a cross-linking agent and/or as a grafting agent. These polymers are usually prepared in several stages.

Olefin-containing copolymers such as olefin acrylates and olefin diene terpolymers can also be used as impact modifiers in the present compositions. An example of an olefin acrylate copolymer impact modifier is ethylene ethylacrylate. Other higher olefin monomers can be employed as copolymers with alkyl acrylates, for example, propylene and n-butyl acrylate. The olefin diene terpolymers are well known in the art and generally fall into the EPDM (ethylene propylene diene) family of terpolymers. Polyolefins such as polyethylene, polyethylene copolymers with alpha olefins are also of use in these compositions.

Styrene-containing polymers can also be used as impact modifiers. Examples of such polymers are acrylonitrile-butadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), and other high impact styrene-containing polymers.

Additionally, and as previously discussed, it is further preferred to employ an inorganic filler to the thermoplastic resin to impart additional beneficial properties such as thermal stability, increased density, stiffness and texture. Typical inorganic fillers include: alumina, amorphous silica, anhydrous aluminum silicates, mica, feldspar, clays, talc, glass flake, glass fibers, glass microspheres, wollastonite, metal oxides such as titanium dioxide, zinc sulfide, ground quartz, and the like. Preferred inorganic fillers may provide a ceramic-like feel to articles thermoformed from resin composition. Preferred inorganic fillers which are employed in the present thermoplastic compositions include: zinc oxide, barium sulfate and fiberglass as well as mixtures of the above.

The molding compositions may include from 0 to about 85% by weight, preferably from about 10 to about 50% by weight or most preferably from about 20 to about 40% by weight of total composition of an inorganic filler component. Barium sulfate is the preferred mineral filler. Barium sulfate may be in the form of the naturally occurring barytes or as synthetically derived barium sulfate using well known synthetic techniques. The particle size may vary, preferably from 0.1 to 50 microns, most preferably from 1 to 15 microns.

In the thermoplastic compositions which contain a crystalline resin and a polycarbonate resin, it is preferable to use a stabilizer material. Typically, such stabilizers are used at a level of 0.01–10 weight percent and preferably at a level of from 0.05–2 weight percent. The preferred stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid, a metal acid pyrophosphate or a mixture thereof. The suitability of a particular compound for use as a stabilizer and the determination of how much is to be used as a stabilizer may be readily determined by preparing a mixture of the crystalline resin component, the polycarbonate with and without the particular compound and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula:

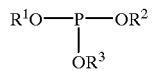

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

The polyacid pyrophosphates maybe of the formula:

$$M^z_x H_y P_n O_{3n+1}$$

wherein M is a metal, x is a number ranging from 1 to 12 and y is a number ranging 1 to 12, n is a number from 2 to 10, z is a number from 1 to 5 and the sum of (xz)+y is equal to n+2.

The composition of this invention finds utility in preparing or forming articles with decorative "marble" surfaces by injection molding, extrusion or blow molding.

Preferred base resin compositions include the following:

| Composition 1 | |
| --- | --- |
| polybutylene terephthalate | 10–35 wt. % |
| aromatic polycarbonate | 20–35 wt. % |
| stabilizer | 0.01–10 wt. % |
| impact modifier | 0–15 wt. % |
| barium sulfate | 40–80 wt. % |
| Composition 2 | |
| polybutylene terephthalate | 15–30 wt. % |
| polyethylene terephthalate | 5–15 wt. % |
| aromatic polycarbonate | 20–30 wt. % |
| stabilizer | 0.05–2 wt. % |
| barium sulfate | 30–60 wt. % |
| Composition 3 | |
| polybutylene terephthalate | 6–10 wt. % |
| polyethylene terephthalate | 5–10 wt. % |
| polycarbonate | 12–20 wt. % |
| stabilizer | 0.01–5 wt. % |
| impact modifier | 1–10 wt. % |
| barium sulfate | 59–73 wt. % |
| Composition 4 | |
| polybutylene terephthalate | 15–50 wt. % |
| polyethylene terephthalate | 10–20 wt. % |
| barium sulfate | 30–75 wt. % |

As used herein and in the appended claims, the term "weight percent" means the percent by weight of each component based on the total weight of composition.

The invention also includes the novel articles made from the compositions of the invention and methods of extrusion, blow molding, sheet forming and thermoforming.

These articles may comprise, e.g., countertops, sinks, shower stalls, building panels, bathroom and kitchen fixtures, plumbing fixtures, tiles, floor coverings, profile moldings, picture frames, as well as other extruded articles of manufacture.

The method of extruding or thermoforming is facilitated by the addition of a rubbery impact modifier and/or a compatible amorphous resin like polycarbonate or especially a branched polycarbonate to a highly filled composition, i.e. more than 35 weight percent of an inorganic filler such as barium sulfate, which includes a polybutylene terephthalate and/or a polyethylene terephthalate resin.

EXAMPLES: A, 1, 2, 3

Comparative Example A and Examples of the Invention 1,2,3 are set forth below. Various combinations of color carrier resins and polyester matrix resins were extruded into sheets 90–125 mils thick and from 1 to 4 ft wide. The same polyester mineral filled matrix resin was combined with a small portion (2%) of color concentrate using several different extruders with different screw designs. The resultant pattern on the sheets was visually evaluated for "marble" appearance. Pellets, about 4 mm diameter by 6 mm long, of carrier resin were mixed with the same sized pellets of matrix resin and fed into the throat of the extruder together. No screen packs were used on the extruder.

The matrix resin had the following composition:

| Mineral Filled PBT Matrix Resin | |
| --- | --- |
| Additive | Weight % |
| PBT (Tm 225° C.) | 17.45 |
| PET (Tm 245° C.) | 9.8 |
| Polycarbonate | 27.25 |
| SEBS Rubber | 7.5 |
| BaSO$_4$ | 37.0 |
| Stabilizers | 0.5 |
| Benzotriazole UV stabilizer | 0.3 |
| Polyester Mold Release | 0.2 |

| Examples | A | 1 | 2 | 3 |
| --- | --- | --- | --- | --- |
| Carrier Resin | PC | PBN | PEN | PCT |
| Carrier Tm °C. | 150 (Tg) | 242 | 270 | 285 |
| Carrier Pigment Color and Level | 2.5% black @ 2% | 3% black @ 2% | 3% black @ 2% | 3–10% black @ 2% |
| Extruder Screw type | 2.5 in barrier Maddock | 2.5 in. conveying | 6 in. Barr ET 30:1 l/d | 2.5 in. barrier Maddock |
| Tm(Tg) Carrier - Tm Matrix | −75° C. | 17° C. | 45° C. | 60° C. |
| Appearance | Complete dispersion | Marble Effect | Marble Effect | Marble Effect |

Carrier Resin Tm was measured by DSC on the second scan using a 20° C./min heating rate.

As can be seen by the examples the higher melting (Tm 242, 270 & 290° C.) polyester carrier resins gave the marble appearance in this matrix in which the PBT (Tm 225° C.) dominates.

Using the 6 in. Barr ET screw marbled sheet of the same matrix resin was also made with PEN color concentrates using 3 or 10% blue, red or tan pigments. Marbleized sheets were also made with a 3% Green PEN concentrate. Concentrates were fed at 0.07–0.3% of the matrix resin although higher levels could also be used.

EXAMPLES OF THE INVENTION 4,5,6,7

These materials were injection molded on an 80 Ton Van Dorn injection molding machine at 480° F. using a 30 sec. cycle with a 150° F. mold temperature using a glass mineral filled PBT matrix with the formula as set forth in the Table below with the pellet size being about 4 mm diameter by 6 mm in length.

| GF-Mineral PBT Matrix Resin | |
|---|---|
| Additive | Weight % |
| PBT (Tm 225° C.) | 33.35 |
| PET (Tm 245° C.) | 15.8 |
| Polycarbonate | 5.0 |
| BaSO$_4$ | 30.0 |
| Fiber Glass | 15.0 |
| Stabilizers | 0.2 |
| Benzotriazole UV stabilizer | 0.3 |
| Polyester Mold Release | 0.2 |

Using PEN or 1:1 PCT mixture with PEN or PBT as color concentrate carrier resins, a marble look was achieved in injection molded 4×1/8 in. edge gated discs. The marble pattern was not as pronounced as the extruded sheet possibly due to more mixing with this particular molding machine set up (screw type, nozzle, injection speed and pressure)

| Examples | 4 | 5 | 6 | 7 |
|---|---|---|---|---|
| Carrier Resin | PEN | PEN | PBT/PCT (1:1) | PEN/PCT (1:1) |
| Carrier Tm °C. | 270 | 270 | 225/285 | 270/285 |
| Carrier Pigment Color and Level | 3% green @ 1% | 3% green @ 1% | 3% green @ 1% | 3% green @ 1% |
| Tm Carrier - Tm Matrix | 45° C. | 45° C. | 60° C. | 60° C. |
| Appearance | Marble Effect | Marble Effect | Marble Effect | Marble Effect |

In order to achieve the optimal "marble" dispersion it is important that in each molding operation that the proper degree of mixing is achieved. These conditions can readily be determined by one skilled in the art through manipulation of processing parameters such as temperature, screw speed, screw type as well as die, gating, mold and nozzle design.

In cases where an equal mixture of crystalline resins are used in the carrier (or matrix), the melting temperature of the higher melting component is chosen to determine the difference in carrier and matrix Tm. Thus in Example 6, a 1:1 mixture of PBT:PCT, the carrier resin Tm is 285 degrees Centigrade. The matrix resin of Example 6 is dominant in PBT (Tm=225 degrees Centigrade). The difference in carrier and matrix resin Tm in Example 6 is 285–225=60 degrees Centigrade. In Example 7, the carrier resin is a 1:1 mixture of PEN:PCT. In this case the PCT Tm dominates the carrier resin mixture. The matrix Tm is dominated by PBT so the difference in Tm is again 60 degrees Centigrade.

Obviously, other modifications and variations of the present invention are possible in the light of the above teachings. For example, the mineral filled compositions can be rendered flame retardant or colored using conventional materials. It is, therefore, to be understood that changes may be made in the particular embodiments described above which are within the scope of the invention as defined in the appended claims.

It is important that in each molding operation that the proper degree of mixing is achieved to give the desired appearance without over mixing which will give a uniformly colored article. This can readily be achieved by those skilled in the art by manipulation of machine variables such as screw speed, feed rate, screw design, temperature profile, mold, nozzle and die design.

What is claimed is:

1. A resin molded article having a non-uniform coloration comprising a molded blend comprising a granular base resin and a granular crystalline resin color concentrate having contrasting color properties, said granular base resin having at least one component being a crystalline resin and said granular color concentrate comprising a crystalline resin carrier in which a colorant is dispersed in said resin carrier and having a melting temperature sufficiently higher than said crystalline resin component of the base resin such that the crystalline resin carrier of the color concentrate is partially melded prior to molding the molded article for non-uniformly dispersing the granular color concentrate in the base resin during molding to produce a non-uniform coloration in said molded article.

2. A resin molded article according to claim 1 wherein the color concentrate comprises a thermoplastic crystalline resin carrier other than the thermoplastic crystalline resin component of the base resin, said color concentrate resin carrier having a melting temperature at least 15 degrees Centigrade above the melting temperature of the crystalline resin component of the base resin.

3. A resin molded article according to claim 2 wherein said color concentrate resin has a melting temperature of from about 25 to about 75 degrees Centigrade above the melting temperature of the crystalline resin component of the base resin.

4. A resin molded article according to claim 2 wherein said color concentrate comprises from about 0.05 to about 25 percent by weight based on the weight of said base resin.

5. A resin molded article according to claim 2 wherein said color concentrate comprises pellets having a spherical or cylindrical shape and a size selected to promote said non-uniform appearance.

6. A resin molded article according to claim 5 wherein said color concentrate has diameter of about 2 to about 15 millimeter when said pellet spherically shaped or a length of about 2 to about 15 millimeter and a diameter of about 2 to about 10 millimeter when said pellet is cylindrically shaped.

7. A resin molded article according to claim 2 wherein said color concentrate comprises a thermoplastic crystalline polyester, polyamide, polyolefin, or polystyrene resin.

8. A resin molded article according to claim 7 wherein said color concentrate comprises a polyester resin.

9. A resin molded article according to claim 7 wherein said color concentrate comprises a poly (alkylenenaphthanoate).

10. A resin molded article according to claim 2 wherein said crystalline resin component of the base resin comprises a crystalline polyester, polyamide, polyolefin, or polystyrene.

11. A resin molded article according to claim 10 wherein said crystalline resin component of the base resin comprises poly(alkylene phthalate).

12. A resin molded article according to claim 10 wherein said base resin comprises at least about 20 percent by weight polyester, from 5 to about 30 percent by weight of an amorphous resin, from 0 to about 40 percent by weight rubbery impact modifier, from 0 to about 70 by weight of a filler material.

13. A resin molded article according to claim 12 wherein said base resin comprises at least about 20% by weight polyester, from 5 to about 30 percent by weight of an amorphous resin, from 2 to about 20 percent by weight rubbery impact modifier, from 10 to about 55 percent by weight of a filler material.

14. A resin molded article according to claim 12 wherein the amorphous resin comprises polycarbonate.

15. A resin molded article according to claim 12 comprising rubbery impact modifiers derived from monomers selected from the group consisting of olefins, vinyl aromatic monomers, acrylic and alkylacrylic acids and ester derivatives as well as conjugated dienes.

16. A resin molded article according to claim 12 wherein said filler material comprises glass fibers.

17. A resin molded article according to claim 12 wherein said filler material comprises mineral material.

18. A resin molded article according to claim 17 wherein said filler material comprises barium sulfate.

19. A resin molded article according to claim 2 comprising an extruded sheet.

\* \* \* \* \*